(12) United States Patent
Kondo et al.

(10) Patent No.: US 6,962,643 B2
(45) Date of Patent: Nov. 8, 2005

(54) METHOD FOR SEALING ROCKER COVER

(75) Inventors: Takeshi Kondo, Tokyo (JP); Isamu Terasawa, Tokyo (JP); Takafumi Shigemori, Tokyo (JP); Yasunori Sakamoto, Tokyo (JP)

(73) Assignees: Mitsubishi Jidosha Kogyo Kabushiki Kaisha, Tokyo (JP); Three Bond Co., Ltd., Tokyo (JP)

( * ) Notice: Subject to any disclaimer, the term of this patent is extended or adjusted under 35 U.S.C. 154(b) by 190 days.

(21) Appl. No.: 09/959,483

(22) PCT Filed: Mar. 6, 2001

(86) PCT No.: PCT/JP01/01713

§ 371 (c)(1),
(2), (4) Date: Oct. 29, 2001

(87) PCT Pub. No.: WO01/66979

PCT Pub. Date: Mar. 6, 2001

(65) Prior Publication Data
US 2002/0158415 A1 Oct. 31, 2002

(30) Foreign Application Priority Data
Mar. 7, 2000 (JP) .................................. 2000-067174

(51) Int. Cl.$^7$ ................................................ C09J 11/04
(52) U.S. Cl. ........................... 156/329; 524/31; 524/32; 524/528
(58) Field of Search ............................ 524/528, 31, 32; 156/329

(56) References Cited

U.S. PATENT DOCUMENTS 3,865,778 A * 2/1975 Christie ....................... 523/212
5,767,183 A * 6/1998 Takei et al. .................. 524/430
5,908,888 A * 6/1999 Nakamura et al. ........... 524/433
5,998,516 A * 12/1999 Burkus et al. ................ 524/86
6,082,446 A * 7/2000 Ahaus et al. ................. 165/173

FOREIGN PATENT DOCUMENTS

| JP | 237267/1985 | 11/1985 |
| JP | 9-296865 | 11/1997 |
| JP | 296865/1997 | 11/1997 |

* cited by examiner

Primary Examiner—Blaine Copenheaver
Assistant Examiner—Barbara J. Musser
(74) Attorney, Agent, or Firm—Lowe, Hauptman & Berner, LLP

(57) ABSTRACT

A sealing method wherein sealing agent composition comprises:
(A) organopolysiloxane having at least two silicon atom bonded alkenyl groups in one molecule;
(B) organohydrogen polysiloxane having at least two silicon atom bonded hydrogen atoms in one molecule;
(C) fumed silica of a specified amount with respect to the components (A) and (B); and
(D) an inorganic filler of a specified amount with respect to the components (A) and (B),
in which the rocker and the cylinder block are pressed such that a hardness of the sealing agent in a cured state is 60 to 80 with a type A durometer of JIS K 6253 and a compression rate of the sealing agent becomes 20 to 40%.

19 Claims, 1 Drawing Sheet

METHOD FOR SEALING ROCKER COVER

TECHNICAL FIELD

The present invention relates to a method of sealing a junction between a cylinder block and a rocker cover.

PRIOR ART

Conventionally, a sealing agent is interposed between a rocker cover and a cylinder block in order to prevent engine oil from leaking out. As this sealing agent, generally, a gasket such as solid packing is known, but it is difficult to automate the process of inserting a pre-formed gasket between the rocker cover and the cylinder block. Moreover, since the shape of the gasket differs with each model of engine, managing the number of parts is complicated.

Recently, on-site formed gaskets have come to be widely used. In an on-site formed gasket, a sealing agent such as silicone rubber is applied on a flange surface, after which it is cured by heating or drying in air such that a gasket layer, or sealing layer, is formed on the flange surface. With this method, however, since the sealing agent is cured in a state applied to the sealing surface, some areas may become thick or thin, or some areas may become wide or narrow, or further, the cross-section may be circular or square, without being constant, or a seam may be formed at an overlapping portion of the application start position and application end position of the sealing agent, thereby resulting in poor surface smoothness and sealing performance.

Accordingly, as disclosed in Japanese Patent Application Laid-open No. SHO 60-237267, polymerizable liquid rubber is applied as a material for forming a sealing layer on the sealing surface, and the liquid rubber applied before this is cured is covered with a recessed cap. The liquid rubber is cured in this state so that a sealing layer of a smooth surface and having a uniform bead height and shape is obtained.

Incidentally, since the gasket for a rocker cover is positioned on the top of the engine block and is used in severe environments of heat and vibration and the like, oil leakage from the rocker cover, even if only slight, is easily recognizable, and oil leakage is easily visible because stains tend to adhere to this location.

With a rocker cover, compared to an oil pan or the like, the number of bolts for fixing the cylinder block cannot be greatly increased. Therefore, the bolt intervals tend to be wider and the surface pressure between bolts is likely to be lower, causing oil leakage. Although the sealing performance is improved by using a flexible rubber such as silicone resin as the sealing agent, a so-called sweating phenomenon may occur. Here, this "sweating phenomenon" refers to a state in which engine oil permeates into the sealing agent itself and oozes out onto the outer surface of the sealing agent, appearing like sweat. The leakage amount of engine oil by this sweating phenomenon is extremely small, but staining such as dust or grime easily adheres to the leaking engine oil. At the same time, it is difficult to distinguish from an oil leak due to defective sealing, which makes it difficult to discover early on leakage of engine oil due to deterioration of the sealing agent itself.

In particular, the sealing layer for a rocker cover is particularly likely to cause a sweating phenomenon compared with the sealing layer of other positions contacting engine oil, and the sweating phenomenon occurs at a portion which is most visible, so preventing it is becoming an important task.

As a result of intensive research into a sealing method capable of preventing the sweating phenomenon, the present inventors found that oil leakage and the sweating phenomenon can be prevented by employing the sealing method as described below.

SUMMARY OF THE INVENTION

That is, the invention provides a sealing method of a rocker cover in which a sealing agent is applied to a flange portion of a rocker cover, is cured, and then the flange portion is pressed to a cylinder block side, characterized in that sealing agent composition comprises:

(A) organopolysiloxane having at least two silicon atom bonded alkenyl groups in one molecule;

(B) organohydrogen polysiloxane having at least two silicon atom bonded hydrogen atoms in one molecule;

(C) 10 to 30 parts by weight of fumed silica with respect to a total of 100 parts by weight of the component (A) and component (B); and (D) 50 to 100 parts by weight of an inorganic filler selected from calcium carbonate, magnesium carbonate, and quartz powder with respect to a total of 100 parts by weight of the component (A) and component (B), and the rocker cover and the cylinder block are pressed such that a hardness of the sealing agent in a cured state is 60 to 80 with a type A durometer of JIS (Japanese Industrial Standard)K 6253 and a compression rate of the sealing agent becomes 20 to 40%.

The organopolysiloxane of the component (A) used in the present invention is a principal component of the composition of the present invention, and it must contain at least two silicon atom bonded alkenyl groups in one molecule. Examples of such an alkenyl group include a vinyl group, allyl group, and prophenyl group. Examples of organic groups other than the alkenyl group are an alkyl group including a methyl group, ethyl group and propyl group; an aryl group including a phenyl group and tolyl group; and a substituent alkyl group including a 3,3,3-trifluoropropyl group and 3-chloropropyl group. The molecular structure of the component (A) may be either a straight chain or a straight chain including a branch. The molecular weight of the component (A) is not particularly limited, and can range from a liquid of low viscosity to a rubber of high viscosity. In order to form a rubber-like elastic body when cured, however, the viscosity at 25° C. is preferred to be 200 to 20000 cs.

The organohydrogen polysiloxane of the component (B) used in the present invention is a crosslinking agent of the component (A), and the silicon atom bonded hydrogen atoms of the component (B) are added to react with the silicon atom bonded alkenyl groups of the component (A), such that the result is crosslinked and cured. The organohydrogen polysiloxane of the component (B) must contain at least two silicon atom bonded hydrogen atoms in one molecule. Examples of an organic group other than the silicon atom bonded hydrogen atoms are an alkyl group including a methyl group, ethyl group and propyl group; an aryl group including a phenyl group and tolyl group; and a substituent alkyl group including a 3,3,3-trifluoropropyl group and 3-chloropropyl group. The molecular structure of the component (B) may be any one of a straight chain, straight chain including a branch, cyclic structure and network. The molecular weight of the component (B) is not particularly limited, but the viscosity at 25° C. is preferably in a range from 3 to 800 cs.

The compound content of the component (B) is such that the ratio of the number of moles of silicon atom bonded hydrogen atoms in the component to the number of moles of the silicon atom bonded alkenyl group in the component (A) becomes (0.5:1) to (10:1), and preferably in a range of (1:1) to (3:1). That is because if the number of moles of the silicon atom bonded hydrogen atoms of the component is less than 0.5 with respect to the number of moles of 1 of the silicon atom bonded alkenyl group of the component (A), sufficient curing will not be achieved, and if it is more than 10, foaming will occur.

The fumed silica of the component (C) is aerosol silica (dry silica) with a specific surface area of approximately 200 to 300 m²/g. The added content of the component (C) is 10 to 30 parts by weight with respect to a total of 100 parts by weight of the component (A) and component (B).

The component (D) is an inorganic filler selected from calcium carbonate, magnesium carbonate, and quartz powder. One type from among these may be used alone or a plurality of these may be mixed. It is preferable that these be surface treated by an organic silicon compound such as organosilane or organosiloxane oligomer. The added content of the component (D) is 50 to 100 parts by weight with respect to a total of 100 parts by weight of the component (A) and component (B). If it is less than 50 parts by weight, when used in the sealing agent of a rocker cover, the sweating phenomenon occurs, and if it exceeds 100 parts by weight, the cured matter becomes too hard and will lack elasticity as a sealing agent.

Further, the hardness of this sealing agent composition in cured state is required to be 60 to 80 with a type A durometer specified by JIS K 6253, and when blended with the above-mentioned added contents, the hardness is further required to be in a range of the specified parameters. A hardness measurement in the cured state is obtained by a measuring method specified in JIS K 6253.

Also, aside from the above-mentioned components, it is also preferred to add a platinum compound catalyst which is a catalyst for crosslinking and curing the component (A) and the component (B). Examples of a platinum compound catalyst include platinum black, platino-chloric acid, alcohol solution of platino-chloric acid, complex compound of platino-chloric acid and olefins, complex compound of platino-chloric acid and alkenyl siloxane, and a thermoplastic resin fine-grain catalyst containing such platinum or platinum compound. The added content of the platinum catalyst is 0.1 to 500 parts by weight, and preferably 1 to 50 parts by weight, as platinum metal, with respect to a total of 1,000,000 parts by weight of the component (A) and component (B). This is because if it is less than 0.1 part by weight, curing is not promoted sufficiently, and if it exceeds 500 parts by weight, it is not economical.

The silicone rubber composition used in the present invention is composed of the component (A) through component (D), and other types of additives well known to be added to the conventional silicone rubber composition can be added. For example, as an additive for suppressing a curing reaction, traces or small amounts of acetylene compound, hydrazines, triazoles, phosphins, and mercaptan may be added so long as it conforms to the purpose of the present invention. Also as required, pigment, heat-resisting agent, flame retardant, internal parting agent, plasticizer and so forth may be added.

Also in the silicone composition used in the present invention, it is preferable to add calcium carbonate in order to reduce the sweating phenomenon, and when the calcium carbonate is surface treated by partial hydrolyzate of tetraalkoxy silane, the sweating phenomenon is further reduced. The alkoxy group of the tetraalkoxy silane is a lower alkoxy, including a methoxy group and ethoxy group. The partial hydrolytic condensate is 150 to 10000 in weight-average molecular weight.

The silicone rubber composition of the present invention is easily manufactured by blending these components (A) to (D) or adding various additives to these as necessary, and mixing uniformly by known kneading means such as two rolls or a kneader-mixer.

The silicone rubber composition is formed as a sealing agent made of silicone rubber by the following forming method.

That is, the sealing agent is applied to a flange surface which is a sealing surface of a rocker cover to be formed. Preferably, grooves or stripes are formed in the flange surface in order to retain the sealing agent. The grooves and stripes act to retain the sealing agent to be formed, as well as prevent leakage of engine oil due to a capillary phenomenon of a separated portion where the interface of the sealing agent and the flange is separated. The cross section of the grooves is preferably V-shaped from the viewpoint of forming ease and retaining power of the sealing agent, but is not limited thereto.

The sealing agent is applied to the flange surface of the rocker cover in beads by means of an automatic application device or the like. At this time, it is applied so as not to admit bubbles or the like in the beads and without leaving any uncoated area, and to a height of approximately 2 to 5 mm from the flange surface. The automatic application device used includes a nozzle at a tip end capable of bead-shaped application.

Consequently, the applied sealing agent is covered with a cap as disclosed, for example, in Japanese Patent Application Laid-open No. SHO 60-237267, and the sealing agent is cured by means such as heating. A concave groove is formed in the cap, and the sealing agent must be built up in a convex form from the flange surface. The surface of the sealing agent cured by the cap is smooth, and the height and width of convex form are uniform. Further, in the application by the nozzle, a seam is likely to be formed at the application start position and the application end position, but it may be corrected into a uniform shape by forming with the cap.

The surface of the cap is preferably treated to be non-sticky by a fluorine process or the like, and it is also preferable to incorporate a heater in the cap to heat and cure the sealing agent which is of a silicone composition.

The rocker cover forming the sealing agent in this manner is assembled into a cylinder head, with the flange surface thereof being the joining surface, and the rocker cover and the cylinder head are pressed together and tightened by bolts or other tightening members. At this time, they are pressed with a compression force that the compression rate of the sealing agent becomes 20 to 40%. This is a state in which the bead height during compression is compressed 20 to 40% with respect to the bead height of the cured sealing agent. If the compression rate is less than 20% when used as the sealing agent between the rocker cover and the cylinder block, the sweating phenomenon may occur in the sealing agent, and if it exceeds 40%, the surface pressure becomes too high and the follow-up performance of the sealing agent becomes poor, and engine oil may leak due to vibration or impact while driving.

BEST MODE OF THE INVENTION

To demonstrate the utility of the present invention, embodiments of the invention are described while referring to comparative examples.

EXAMPLE 1

To 100 parts of dimethyl polysiloxane of a viscosity of 1000 cs with both ends sealed with a dimethyl vinyl siloxy group (vinyl group content 0.000125 mol/g, number of vinyl groups in 1 molecule: 2, average number of dimethyl siloxane units interposed between vinyl groups: 216), 20 parts of fumed silica with a specific surface area of 300 m$^2$/g, 60 parts of magnesium carbonate having a surface treated with partial hydrolyzate of tetraalkoxy silane, 6 parts of hexamethyl disilazane, and 3 parts of water were added in a kneader-mixer and stirred for 3 hours, and a rubber compound was obtained.

To this, further, 2.18 parts of a straight-chain dimethylsiloxane-methylhydrogen siloxane copolymer having 10 silicon atoms, 4 hydrogen groups, and a methyl group, 0.1 part of a 1% isopropyl alcohol solution of platino-chloric acid, and 0.1 part of ethyl cyclohexanol as a reaction suppressant were added and mixed uniformly, and a silicone composition was obtained.

Figure 1:
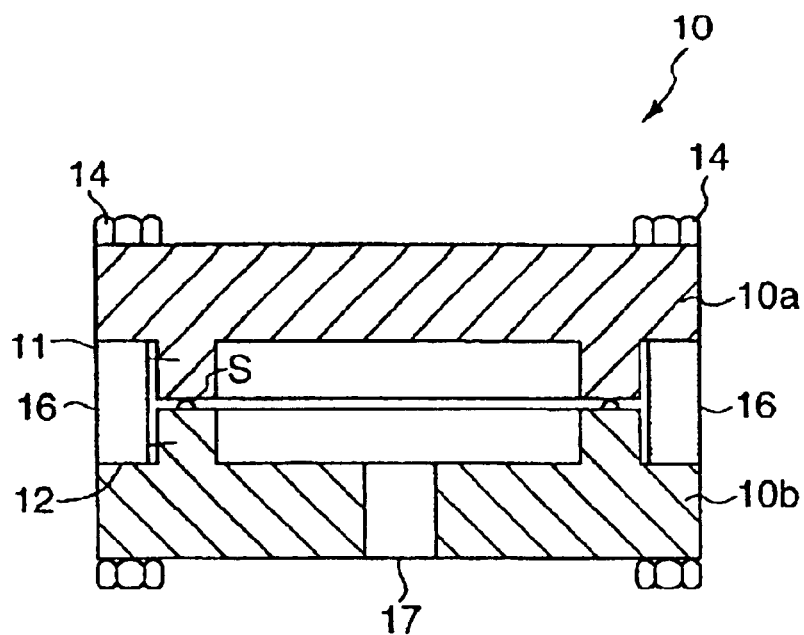
FIG. 1(a) is a schematic sectional view of a dummy container for a pressure test used in the embodiment.
FIG. 1(b) is a plan view of a lower container comprising the container.
Figure 1:
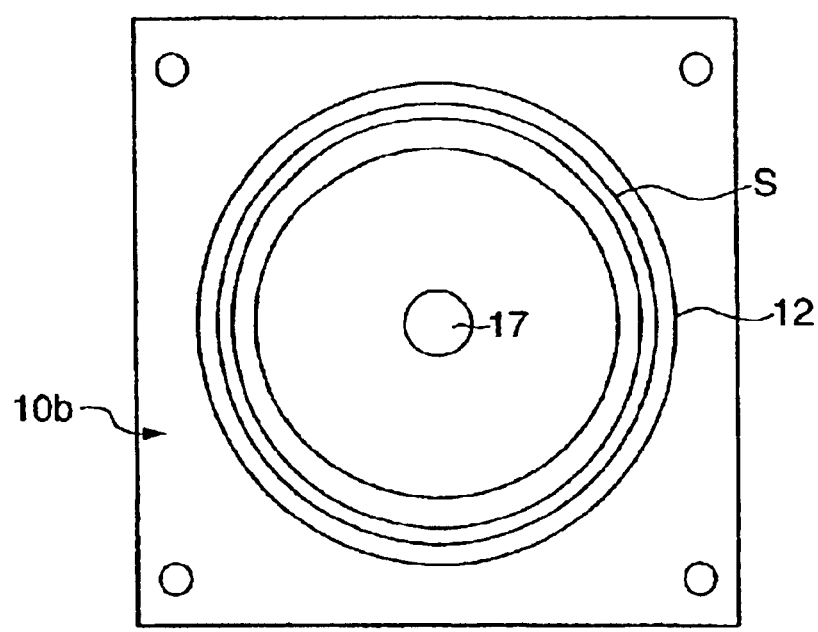

An experiment was conducted using a dummy container 10 shown in FIGS. 1(a) and 1(b), similar to a flange pressure vessel for a pressure test specified in JIS K 6820. This dummy container 10 comprises an upper container 10a having a circular upper flange 11 of a 52 mm inside diameter, 80 mm outside diameter, 14 mm flange width, and 10 mm flange height, and a lower container 10b having a lower flange 12 of the same dimensions as the upper flange 11. The upper container 10a and lower container 10b are joined, flange to flange, at four positions by tightening elements 14 comprising bolts and nuts.

The above-mentioned composition was used, being applied in substantially the center of the flange 12 surface of the lower container 10b in a circular pattern along the flange shape with a bead width of 10 mm and a height of 3 mm, using a robot mixing applicator not shown in the drawing. Then it was covered by a cap, not shown in the drawings, having a circular recess of a width of 10 mm and a depth of 2.8 mm, and heated for 60 minutes at 120° C. When the cap was removed, a cored sealing agent S of smooth surface of a height of 2.8 mm was formed. Upon measuring the cured sealing agent S, it was 63 with a type A durometer specified in JIS K 6253.

A flange 12 of the lower container 10b forming the sealing agent S and the flange 11 of the upper container 10a were joined face to face and tightened using the tightening elements 14, such that the sealing agent S was compressed. At this time, in order to keep the compressing distance of the sealing agent S constant, it is preferable to use a spacer 16 between the upper and lower containers 10a and 10b.

By selecting the height of a spacer 16 to be 21.95 mm and tightening the bolts and nuts, the flanges 11, 12 were pressed so that the interval of the abutting faces became 1.95 mm. At this time, the compression rate of the sealing agent was about 30%. Then the container 10 was filled up with SG5W-30 engine oil from an oil feed port 17 formed in the bottom of the lower container 10b, and the oil feed port 17 was sealed. This was then put into a 150° C. heating oven and heated for 240 hours. The internal pressure of the container raised from the heating.

After heating, upon visual confirmation of the flange junction without disassembling the container, no leakage of engine oil was found. Further, white powder was sprinkled over the flange junction but the surface of the sealing agent was dry so the white powder did not adhere to the surface of the sealing agent. As a result, absence of the sweating phenomenon was demonstrated.

EXAMPLE 2

To 100 parts of dimethyl polysiloxane of a viscosity of 1000 cs with both ends sealed with a dimethyl vinyl siloxy group (vinyl group content 0.000125 mol/g, number of vinyl groups in 1 molecule: 2, average number of dimethyl siloxane units interposed between vinyl groups: 216), 10 parts of fumed silica with a specific surface area of 300 m$^2$/g, 90 parts of magnesium carbonate having a surface treated with partial hydrolyzate of tetraalkoxy silane, 6 parts of hexamethyl disilazane, and 3 parts of water were added in a kneader-mixer and stirred for 3 hours, and a rubber compound was obtained.

To this, further, 2.18 parts of a straight-chain dimethylsiloxane-methylhydrogen siloxane copolymer having 10 silicon atoms, 4 hydrogen groups, and a methyl group, 0.1 part of a 1% isopropyl alcohol solution of platino-chloric acid, and 0.1 part of ethyl cyclohexanol as a reaction suppressant were added and mixed uniformly, and a silicone composition was obtained.

This composition was tested similarly using the same dummy container as in Example 1. However, the sealing agent was applied with a bead width of 6 mm and a height of 3 mm. The cap used had a recess of a width of 6 mm and a depth of 2.8 mm. By heating for 1 hour at 120° C. with the cap, a sealing agent of a smooth surface of 2.8 mm in height was formed. Upon measuring the hardness of the cured sealing agent, it was 75 with the type A durometer.

Same as in Example 1, this was pressed so that the flange surface interval became 1.7 mm. At this time, the sealing agent was compressed about 40%. Also as in Example 1, it was filled engine oil and put into a heating oven, and an acceleration test was conducted. After heating, neither engine oil leakage nor the sweating phenomenon was found to occur. Further, white powder was sprinkled over the junction of the rocker cover and the cylinder block of the engine. The sweating phenomenon was confirmed but the white powder did not adhere to the surface of the sealing agent.

EXAMPLE 3

The silicone composition used in Example 1 was formed using the dummy flange just as in Example 1, and a sealing agent of the same bead shape as in Example 1 was obtained. Upon measuring the hardness of the cured sealing agent, and it was 63 with the type A durometer.

Just as in Example 1, it was pressed so that the flange surface interval became 2.2 mm. At this time, the sealing agent was compressed about 20%. Also as in Example 1, it was filled with engine oil and put in a heating oven, and an acceleration test was conducted. After heating, neither engine oil leakage nor the sweating phenomenon was found to occur. Further, white powder was sprinkled over the junction of the rocker cover and the cylinder block of the engine. The sweating phenomenon was confirmed but the white powder did not adhere to the surface of the sealing agent.

COMPARATIVE EXAMPLE 1

To 100 parts of dimethyl polysiloxane of a viscosity of 1000 cs with both ends sealed with a dimethyl vinyl siloxy group (vinyl group content 0.000125 mol/g, number of vinyl groups in 1 molecule: 2, average number of dimethyl siloxane units interposed between vinyl groups: 216), 30 parts of fumed silica with a specific surface area of 300 m$^2$/g, 20 parts of magnesium carbonate having a surface treated with partial hydrolyzate of tetraalkoxy silane, 20 parts of magnesium carbonate, 6 parts of hexamethyl disilazane, and 3 parts of water were added in a kneader-mixer and stirred for 3 hours, and a rubber compound was obtained.

To this, further, 2.18 parts of a straight-chain dimethylsiloxane-methylhydrogen siloxane copolymer having 10 silicon atoms, 4 hydrogen groups, and a methyl group, 0.1 part of a 1% isopropyl alcohol solution of platino-chloric acid, and 0.1 part of ethyl cyclohexanol as a reaction suppressant were added and mixed uniformly, and a silicone composition was obtained.

An experiment was conducted using the same dummy container as in Example 1. The sealing agent was applied to the lower flange of the dummy container in bead shapes of a width of 10 mm and a height of 3 mm, and cured according to the same conditions as in Example 1. Upon measuring the hardness of the cured sealing agent, it was 48 with the type A durometer. Same as in Example 1, it was filled with engine oil and heated in a heating oven. By selecting the height of the spacer 16 to be 21.95 mm and tightening the bolts and nuts, the flanges 11, 12 were pressed so that the interval of the abutting faces became 1.95 mm. At this time, the compression rate of the sealing agent was about 30%.

After heating, upon visual confirmation of the flange junction without disassembling the container, no leakage of engine oil was found. The surface of the sealing agent was glossy, and upon sprinkling white powder over the flange junction, the white powder adhered to the surface of the sealing agent. As a result, the sweating phenomenon was generated.

COMPARATIVE EXAMPLE 2

The same sealing agent as used in Example 1 was applied in a bead width of 10 mm, and using a cap, a sealing agent of a smooth surface of 2.8 mm in height was formed. Upon measuring the hardness of the cured sealing agent, and it was 63 with the type A durometer.

This dummy container was pressed so that the flange surface interval of the dummy container became 2.5 mm. At this time, the sealing agent was compressed about 15%. According to the same conditions as in Example 1, the container was filled with the same engine oil and put into a heating oven. After heating, upon visual confirmation, engine oil leakage was not found to occur, but the sweating phenomenon had been generated. When white powder was sprinkled over the junction, the white powder adhered to the surface of the sealing agent.

COMPARATIVE EXAMPLE 3

The same sealing agent as used in Example 1 was applied in a bead width of 10 mm and a height of 3 mm, and using a cap, a sealing agent of a smooth surface of 2.8 mm in height was formed. Upon measuring the hardness of the cured sealing agent, and it was 63 with the type A durometer.

The dummy container was pressed until the flange interval became 1.5 mm. At this time, the sealing agent was compressed 46%. According to the same conditions as in Example 1, the container was filled with the same engine oil and put into a heating oven. After heating, upon visual confirmation, engine oil leakage was not found to occur, but the sweating phenomenon had been generated. When white powder was sprinkled over the junction, the white powder adhered to the surface of the gasket.

As is clear from the description herein, according to the present invention, a sealing method having excellent effects not found in related art can be provided, in which, even when using an on-site formed sealing agent, engine oil does not leak and the sweating phenomenon of engine oil permeating through the sealing agent itself and oozing out to the surface can be avoided.

What is claimed is:

1. A method of sealing a rocker cover to a cylinder block comprising: applying to a flange portion of said rocker cover a composition comprising:
   (A) an organopolysiloxane having at least two silicon atom-bonded alkenyl groups per molecule;
   (B) an organohydrogen polysiloxane having at least two silicon atom-bonded hydrogen atoms per molecule;
   (C) 10 to 30 parts by weight of fumed silica with respect to a total of 100 parts by weight of said component (A) and component (B); and
   (D) 50 to 100 parts by weight of an inorganic filler selected from the group consisting of calcium carbonate, magnesium carbonate and quartz powder with respect to a total of 100 parts by weight of said component (A) and component (B),
   curing said sealing agent to a hardness of 60 to 80 as measured with a type A durometer according to JIS K 6253, and
   compressing said sealing agent between said rocker cover and said cylinder block at a compression of 20 to 40%.

2. A method of sealing a rocker cover to a cylinder block of claim 1, wherein the ratio of the number of moles of silicon atom-bonded hydrogen atoms in said component (B) to the number of moles of a silicon atom-bonded alkenyl group in said component (A) is 0.5:1 to 10:1.

3. A method of sealing a rocker cover to a cylinder block of claim 1, further comprising including in said sealing composition a platinum compound crosslinking catalyst for curing said component (A) and component (B).

4. A method as claimed in claim 1, wherein said sealing agent is cured in situ.

5. An assembly comprising a rocker cover, a cylinder block and a sealing agent disposed between said rocker cover and said cylinder block wherein said sealing agent comprises the cured product of a composition comprising:
   (A) an organopolysiloxane having at least two silicon atom-bonded alkenyl groups per molecule;
   (B) an organohydrogen polysiloxane having at least two silicon atom-bonded hydrogen atoms per molecule;
   (C) 10 to 30 parts by weight of fumed silica with respect to a total of 100 parts by weight of said component (A) and component (B); and
   (D) 50 to 100 parts by weight of an inorganic filler selected from the group consisting of calcium carbonate, magnesium carbonate and quartz powder with respect to a total of 100 parts by weight of said component (A) and component (B), that has been cured to a hardness of about 60 to 80 and is compressed between said rocker cover and said cylinder block about 20 to 40%.

6. An assembly as claimed in claim 5, wherein said composition further comprises a platinum cross linking catalyst.

7. An assembly as claimed in claim 5, wherein said composition comprises a ratio of the number of moles of silicon atom-bonded hydrogen atoms in said component (B) to the number of moles of silicon atom-bonded alkenyl group in said component (A) of about 0.5:1 to 10:1.

8. An assembly as claimed in claim 5, wherein said composition is in a cured state prior to compressing it between said rocker cover and said cylinder block.

9. A method of sealing a rocker cover to a cylinder block of claim 1, wherein said alkenyl groups of said organopolysiloxane (A) are selected from the group consisting of vinyl, allyl and propenyl.

10. A method of sealing a rocker cover to a cylinder block of claim 1, wherein said organopolysiloxane (A) is dimethyl polysiloxane with both ends sealed with a dimethyl vinyl siloxy group.

11. A method of sealing a rocker cover to a cylinder block of claim 1, wherein said organohydrogen polysiloxane (B) is straight-chain dimethylsiloxane-methyihydrogen siloxane copolymer.

12. A method of sealing a rocker cover to a cylinder block of claim 1, wherein a content of said organohydrogen polysiloxane (B) is such that a ratio of a number of moles of silicon atom-bonded hydrogen atoms in the organohydrogen polysiloxane (B) to a number of moles of the silicon atom-bonded alkenyl group in the organopolysiloxane (A) is 0.5:1 to 10:1.

13. A method of sealing a rocker cover to a cylinder block of claim 1, wherein the fumed silica (C) is aerosol silica with a specific surface area of about 200 to 300 m²/g.

14. A method of sealing a rocker cover to a cylinder block of claim 1, wherein the inorganic filler (D) is surface treated with an organosilane or organosiloxane oligomer.

15. A method of sealing a rocker cover to a cylinder block of claim 14, wherein the inorganic filler (D) is calcium carbonate surface treated with partial hydrolyzate of tetraalkoxy silane, wherein said alkoxy is lower alkoxy; said partial hydrolyzate having a weight-average molecular weight of from 150 to 10,000.

16. A method of sealing a rocker cover to a cylinder block of claim 1, which further comprises prior to applying said composition to said flange portion of said rocker, forming grooves or stripes on a surface of said flange in order to retain said composition.

17. A method of sealing a rocker cover to a cylinder block of claim 1, wherein said grooves or stripes have a v-shaped cross-section.

18. A composition comprising a cured product of a composition comprising:
 (A) an organopolysiloxane having at least two silicon atom-bonded alkyl groups per molecule;
 (B) an organohydrogen polysiloxane having at least two silicon atom-bonded hydrogen atoms per molecule;
 (C) 10 to 30 parts by weight of fumed silica with respect to total pf 100 parts by weight of said component (A) and component (B); and
 (D) 50 to 100 parts by weight of an inorganic filler which is calcium carbonate surface treated with a partial hydrolyzate of tetraalkoxy silane, wherein said alkoxy is lower alkoxy; said partial hydrolyzate having a weight-average molecular weight of from 150 to 10,000.

19. The composition of claim 18, having a hardness after curing of 63 to 75.

* * * * *